(12) United States Patent
Brewington et al.

(10) Patent No.: US 6,710,346 B2
(45) Date of Patent: Mar. 23, 2004

(54) ACTIVE INFRARED PRESENCE SENSOR

(75) Inventors: James Gabriel Brewington, Raleigh, NC (US); James Lewis Levine, Yorktown Heights, NY (US); Duane Scott Miller, Wake Forest, NC (US); Michael Alan Schappert, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 218 days.

(21) Appl. No.: 09/923,253

(22) Filed: Aug. 2, 2001

(65) Prior Publication Data

US 2003/0025082 A1 Feb. 6, 2003

(51) Int. Cl.[7] .............................................. G05B 13/18
(52) U.S. Cl. ..................................................... 250/341.8
(58) Field of Search ....................................... 250/341.8

(56) References Cited

U.S. PATENT DOCUMENTS 6,161,814 A * 12/2000 Jahrling ...................... 250/221
6,215,116 B1 * 4/2001 Van Marcke ............... 250/221

OTHER PUBLICATIONS

IBM Technical Disclosure Bulletin, vol. 38, No. 12, Dec. 1995, YO894–0106 SSS, J.L. Levine and M.A. Schappert, (pp. 419–421).

* cited by examiner

Primary Examiner—Constantine Hannaher
(74) Attorney, Agent, or Firm—Richard M. Ludwin, Esq.; McGinn & Gibb, PLLC (57) ABSTRACT

A presence detector includes an optical emitter for emitting optical radiation, an optical detector for detecting a presence of an object based on receiving the optical radiation, and a microcontroller for controlling the optical emitter and processing the optical detector output, such that a range adjustment and range hysteresis based on the object are provided by software in the microcontroller.

29 Claims, 5 Drawing Sheets

ACTIVE INFRARED PRESENCE SENSOR

BACKGROUND OF THE INVENTION

1. Field of the Invention

The present invention generally relates to a sensor, and more particularly to an active infrared presence sensor.

2. Description of the Related Art

Electrical energy can be saved by automatically powering down computer terminals and associated hardware during periods of inactivity. This is often done by detecting a lack of input activity (e.g., inputs via keyboard, mouse, etc.) for some predetermined period of time, with power being restored when activity resumes.

However, this is unsatisfactory for certain applications, such as point-of-sales (POS) terminals, because of the delays and/or extra keystrokes. It is also annoying to have a terminal power-down when one is seated in front of it. Further, it is unacceptable for unattended walkup kiosks, as this would require an untrained customer to first recognize that the kiosk was actually operational but in a power-down state, and then initiate the power-on state.

In both cases, a better solution is to directly sense the presence or absence of an operator. Very generally, such detectors can be characterized as sensing either motion or presence of a user. Presence sensors are preferable for a POS or other terminal where the operator may be seated, as it is then possible to be nearly motionless for an extended period of time. Either type of sensor can be used for a walkup kiosk.

An additional requirement for either a presence or motion sensor is that it be capable of discriminating between the operator and a random passerby or even a nearby stationary object. Thus, a sensor with well-controlled range and directional properties is required.

Yet another requirement is very low cost. This requirement suggests using components which are mass-produced for a much larger market. A final requirement is to provide a method to adjust the sensing range to accommodate various physical arrangements, preferably one which can be performed by unskilled personnel.

Although presence sensors can be built using ultrasonic, electrical, and optical radiators and detectors, currently it appears that the goal of very low cost can be met best by using a narrow-beam infrared (IR) emitter to direct IR radiation towards the operator position, and an infrared detector to measure the return radiation reflected from the operator.

Such a system was described in "Active Infrared Presence Sensor", J. Levine and M. Schappert, IBM Technical Disclosure Bulletin (TDB), Volume 37, No. 12, page 419 (December 1995), which is hereby incorporated by reference. This sensor made use of a low-cost IR detection module intended for use in remote control systems. However, this sensor lacked certain beneficial features and improvements of the present invention as described below.

That is, prior to the present invention, there was no known solutions to the problem of on/off "chattering" when the operator was positioned at the edge of the detection range. In other words, the sensor lacked range hysteresis. Further, there was no low-cost and easily manufactured mounting arrangement. Such an arrangement must provide cleanable windows which protect the optical components, maintain the integrity of the display covers (e.g., against contamination such that the covers are sealed well enough to be spill-resistant), and do so while preventing excessive coupling between the IR emitter and detector.

SUMMARY OF THE INVENTION

In view of the foregoing and other problems, drawbacks, and disadvantages of the conventional methods and structures, an object of the present invention is to provide a very low cost presence sensor to detect a stationary operator.

It is a second object of this invention to provide a presence sensor with angular response limited to the expected angular position and size of a display operator.

It is a third object of this invention to provide a presence sensor having a precise detection range, the range being adjusted automatically when desired by unskilled personnel.

It is a fourth object of this invention to provide a presence sensor having range hysteresis, so that the output signal does not chatter between on and off.

It is a fifth object of this invention to provide a low-cost mechanism for integrating such a presence sensor into the bezel of a display terminal in a way which allows cleaning and touching of the terminal while protecting the sensor from damage, maintains the integrity of the terminal (e.g., against contamination), and avoids direct coupling of IR radiation from the emitter to the detector.

In a first aspect of the present invention, a presence detector includes an optical emitter for emitting optical radiation, an optical detector for detecting a presence of an object based on receiving reflected optical radiation, and a microcontroller for controlling the optical emitter and processing the output of the optical detector, such that a range adjustment and range hysteresis based on the object are provided by software in the microcontroller.

In a second aspect, a display terminal includes an optical emitter for emitting optical radiation, an optical detector for detecting a presence of an object based on receiving reflected optical radiation, and a microcontroller for controlling the optical emitter and processing the output of the optical detector, such that a range adjustment and range hysteresis based on the object are provided by software in the microcontroller.

With the above and other unique and unobvious aspects, the invention uses a modulated light emitting diode (LED) which emits infrared radiation (IR) over a narrow range of angles centered on the expected location of a terminal operator. Infrared radiation is preferred over visible radiation because it is not distracting, and is less likely to be absorbed by clothing. The radiation reflected from the operator is detected by an IR detection module intended for use in remote control receivers (e.g., VCR or TV). A small microcontroller drives the LED with a pulse sequence optimized for detection by the module. The digital output of the module is processed by the microcontroller to determine the presence or absence of an operator and to provide a power-down control signal to the POS terminal.

Processing includes noise reduction, and the prevention of rapid on/off cycling when an operator is at the edge (threshold) of the detection range. This is done despite the use of modules which lack any external adjustment and provide only a logic level (0 or 1) output signal in response to infrared input. Range calibration service is also provided by the microprocessor via a digital input command signal.

The major difficulties to be overcome are associated with the low-cost detection modules. These are completely self-contained and have no adjustable parameters. In particular, they operate at a fixed modulation frequency, bandwidth, and detection threshold. Further, they feature an automatic gain control which gives them a very large dynamic range. At low signal levels, the gain is very high and the detection threshold is fixed at a level such that the signal-to-noise ratio (SNR) is low. This is not a problem in their intended application, as the threshold corresponds to a one-way range of tens of meters, well beyond the usual operating range for VCR remote control units.

That is, in normal use, the gain is automatically reduced to a level such that the SNR is very high. Noise is a problem in the current application because presence detection inherently occurs when the signal is just strong enough to be detected (i.e., cross the threshold). At this level, the gain is very high and the SNR is low.

As a result, some form of post-detection filtering is useful for reliable presence sensing. Such filtering is made difficult by the fact that, as noted above, the only available output signal is a logic level which changes from 1 to 0 when the correct pulse sequence (see below) is detected. It is further complicated by the very low-cost microcontroller, which is fast but has a very limited instruction set.

Another advantage is that the range can be adjusted by the operator without assistance. This would be difficult or impossible if the operator had to first position himself at the desired range and then reach out with a screwdriver to adjust a variable resistor. That is, even if the user could reach the screw, it is likely that the user's arm would be detected.

BRIEF DESCRIPTION OF THE DRAWINGS

The foregoing and other purposes, aspects and advantages will be better understood from the following detailed description of a preferred embodiment of the invention with reference to the drawings, in which.

DETAILED DESCRIPTION OF PREFERRED EMBODIMENTS OF THE INVENTION

Referring now to the drawings, and more particularly to FIGS. 1–5, there are shown preferred embodiments of the method and structures according to the present invention.
Preferred Embodiment Generally, the invention operates with a novel method and structure in which an operator/user is detected by emitting electromagnetic (EM) radiation (e.g., preferably infrared radiation) to an area in front of a display and detecting whether an operator is present by detecting a return/reflection of the EM radiation in the form of pulses. If an operator is not detected for a predetermined time period (e.g., if the fraction of the transmitted pulses which are detected is less than a predetermined threshold), then the display is turned off (e.g., put in a "sleep" mode). By the same token, should an operator/user be detected (e.g., if the fraction of the transmitted pulses which are detected is greater than a second predetermined threshold), then the display is either rendered in an active state ("turned on") or, if already in an "ON" state, the display is maintained in the "ON" state.

Figure 1:
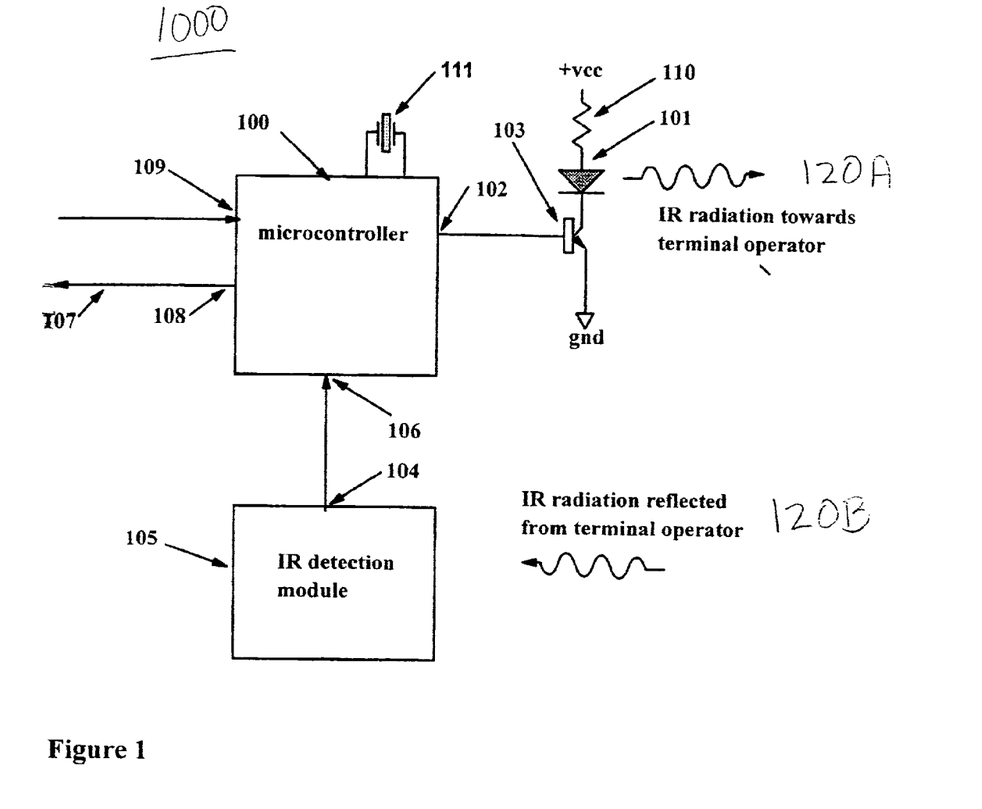
FIG. 1 is a block diagram schematically illustrating a system 1000 of the present invention.

Turning now to FIG. 1, a system 1000 is shown according to the present invention. Generally, system 1000 includes a microcontroller 100, and a detection module 105. Preferably, the detection module 105 is an infrared (IR) detection module. Multiple emitters and/or detectors may be used to increase the angular and/or spatial range of the presence sensor.

As shown in FIG. 1, a feedback loop (unreferenced) is formed by IR radiation 120A being emitted towards a terminal operator and IR radiation 120B being reflected from the terminal operator back to the IR detection module 105.

Further, as shown in FIG. 1, the system 1000 preferably includes a crystal (e.g., quartz or ceramic) resonator 111 for controlling the microcontroller clock frequency. The IR detection modules 105 are sharply tuned to a predetermined frequency (e.g., 38 kHz etc.), with a bandwidth of about one percent of this frequency. Therefore, the LED must be pulsed close to this frequency. This is done by a program in the microcontroller which basically counts clock cycles. Hence, the pulsing frequency is directly proportional to the microcontroller clock frequency. It is therefore essential that this frequency be controlled to about 0.1%, hence the use of the crystal.

It is noted that the crystal 111 could be replaced by a conventional resistor-capacitor (RC) circuit, but this arrangement is not preferred over the crystal 111 as a less reliable configuration results even in the case of a "trimmed" RC circuit.

Looking at the components of FIG. 1 in greater detail, the IR detection module 105 contains a photo-detector feeding a narrow band amplifier or the like with automatic gain control (AGC). This is followed by a special AC-to-DC converter, an integrating filter, and a voltage comparator.

The voltage comparator provides the digital output signal, which changes state when a proper pulse sequence is detected. The proper sequence varies slightly between modules made by different manufacturers, and/or optimized for particular operating environments. The recommended sequence is described in the manufacturer's specification sheets, usually in terms of the time duration for the sequence. A typical recommended sequence has a duration of about 630 microseconds, corresponding to 24 pulses at a 38 kHz repetition rate. This sequence can be repeated after a gap of equal duration. For these modules, the amplifier center frequency, bandwidth, detection threshold level and other properties are fixed internally and cannot be adjusted. These limitations are overcome by the software used in the microcontroller.

As further shown in FIG. 1, microcontroller 100 drives a light emitting diode (LED) 101 via an output pin 102 and a transistor 103. Series resistor 110 determines the LED drive current. The output pin 104 of IR detection module 105 is connected to an input pin 106 of microcontroller 100.

The power-down signal 107 to the POS terminal (not shown) is generated at an output pin 108 of microcontroller 100. Input pin 109 is used to initiate a range calibration.

Thus, as shown in FIG. 1, the detector (e.g., in an examplary implementation, Model SFH5110 manufactured by Infineon Technologies AG) is a low-cost self-contained module intended for use in TV remote control systems. It is specifically designed to detect a short group (e.g., 24) of pulses with a repetition rate, i.e. center frequency of (e.g., 38 kHz).

However, it is noted that while the device is extremely inexpensive and very sensitive, there is no way to adjust the sensitivity. Further, the only output is a logic level signal which changes from 1 to 0 when a pulse group is detected. Some form of sensitivity adjustment is obviously needed to use this otherwise excellent device as a presence detector. Thus, another aspect of the present invention is directed to sensitivity adjustment.

Hence, the invention overcomes this limitation of sensitivity adjustment, and specifically in the invention the width of the individual drive pulses is controlled by the microcontroller to adjust the effective infrared power, and thus control the detection range.

The invention uses a first algorithm whereby the microcontroller can automatically determine the proper pulse width for any desired range. A second algorithm may be used in which a predetermined percentage (e.g., 50 percent) of a fixed number (e.g., 10) of emitted pulse groups is required for a valid presence detection.

However, the present inventors have noted that one practical problem with this arrangement is that the presence detection output signal from the microcontroller will "chatter" on and off if the display operator is located at the precise range for which the device was calibrated, leading to an unacceptable on/off behavior of the display.

To avoid such a problem, the present invention uses a different criterion for detection of an operator than for non-detection. That is, as described below, the invention requires that a predetermined number/percentage (e.g., 70) out of a second predetermined number (e.g., 100) pulse groups be detected before turning on the display. Once this occurs, the invention requires that the number/percentage of detections out of a second predetermined number (e.g., 100) fall below a lower predetermined number/percentage (e.g., 30) before turning off the display. This provides a "deadzone" of several inches, thereby eliminating the chatter. Obviously, the invention is not limited to the above values.

Figure 2:
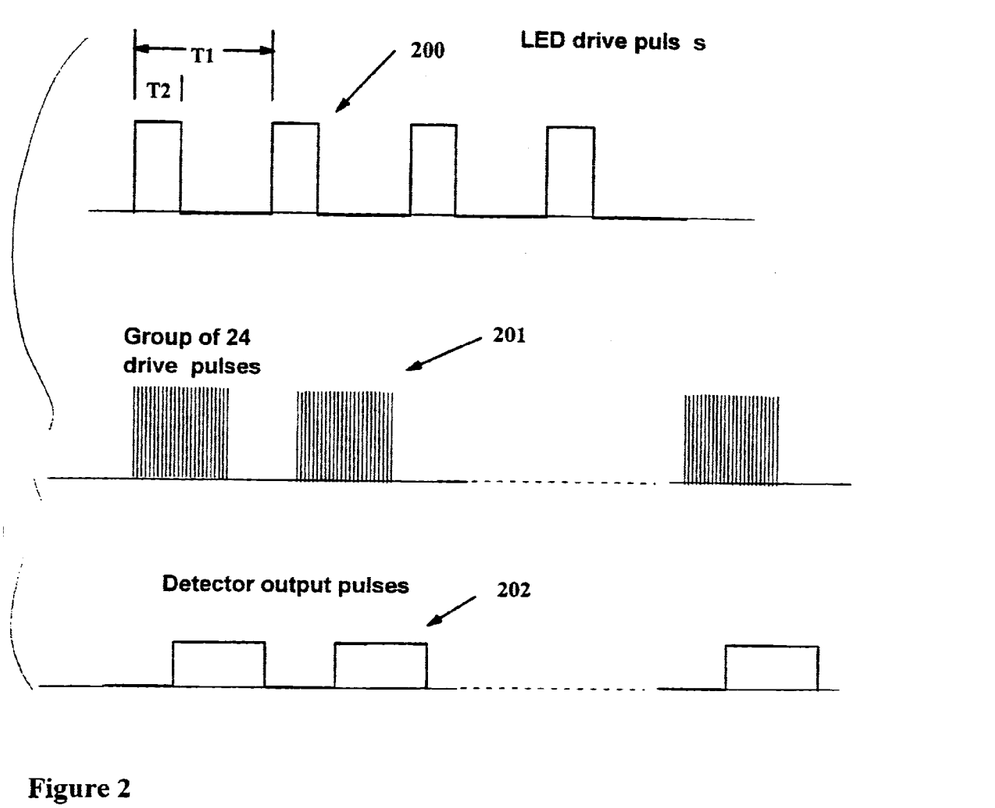
FIG. 2 illustrates a set of graphs illustrating the waveforms employed by the components in the system 1000 of FIG. 1.

Turning to FIG. 2, the LED current waveform 200 is shown. This waveform is generated by a simple program running in the microcontroller 100 which uses several nested loops. In the waveform 200, the time T1 must be made equal to the inverse of the center frequency Fc of the module's amplifier. For example, if the center frequency is 38 kHz, then T1=26.3 µs.

A simple counting loop raises and lowers the voltage at output pin 102 at predetermined values of a counting variable. Letting T0 be the microcontroller instruction time, and letting N1 be the number of instructions taking place during the time T1. Then:

$$T_1 = N_1 T_0 = 1/F_m \tag{1}$$

Resonator 111 of FIG. 1 controls the frequency of the microcontroller oscillator with an accuracy of preferably about 0.1%. The instruction time T0 of microcontroller 100 is a multiple, M, of the oscillator period, i.e.:

$$T_0 = M/F_0 \tag{2}$$

The value for M is 4 for the selected microcontroller (e.g., manufactured by Microchip Technology as Model No. PIC12C518). Solving equations 1 and 2 for $F_0$, one obtains:

$$F_0 = N_1 M F_m \tag{3}$$

Because N1 and M in equation 3 can only take on integer values, the clock frequency must be chosen as an integer multiple of the amplifier center frequency Fm.

In waveform 200, the time T2 sets the duration of the LED drive pulse. T2 controls the average IR power within the bandpass of the amplifier, and is used to control the detection range. Let the number of instructions which define the time T2 be N2, then:

$$T_2 = N_2 T_0 \tag{4}$$

Because the amplifier in the module has a very narrow bandwidth, the effective IR power available for detection (e.g., Pe) must be obtained by Fourier analysis of waveform 200. The result is proportional to:

$$P_e \propto (2/\pi)\sin(\pi T_2/T_1) \propto (2/\pi)\sin(\pi N_2/N_1) \tag{5}$$

Pe increases with increasing N2 up to a maximum value of $(2/\pi)$ at $T_2=T_1/2$, and then decreases. Because $N_2$ can only change in steps of 1, $N_1$ should be made as large as possible to allow for small steps in power.

For example, let $N_1=26$, M=4, and F=38 Khz. Then from equation 3, $F_0=3.952$ Mhz. In practice, a standard 4 MHz resonator can be used, as the resulting frequency will then fall within the pass band of the amplifier. This choice would appear to allow 26 power levels. However, several instructions are required inside the programming loop to control the flow of the program, thereby limiting the actual number of power levels to 13.

Referring again to FIG. 2, waveform 200 is used to generate repeated groups of 24 pulses of IR radiation, as shown at 201. It is noted again that the number 24 is not a fixed number, but depends on the module properties as described in the manufacturer's specifications. Further, the actual number may differ somewhat from the specifications without significant effect. Returning to FIG. 2, if the IR radiation reflected to the module is strong enough, the module output signal 104 will rise after some number of drive pulses as indicated in waveform 202, with the number decreasing as the power is increased. At the threshold power, which is the case of interest, the rise does not occur.

Therefore, the microcontroller tests the module output signal for a detection following each LED drive pulse. If a detection is found for any pulse in the group of pulses (e.g., 24 pulses), then a detection is recorded for that group. It is also possible to test for a detection only after the last pulse in a group, with somewhat degraded performance.

Figure 3:
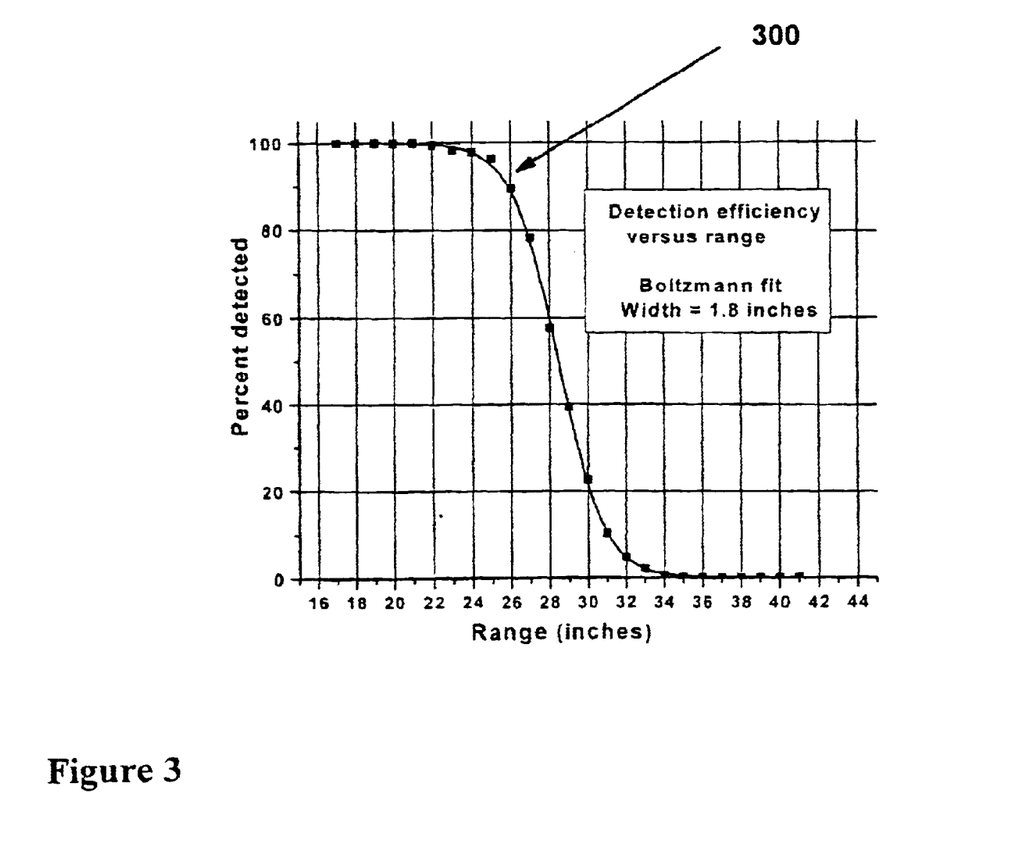
FIG. 3 illustrates a graph of detection probability versus distance for the infrared detection system 1000 of FIG. 1.

The detection properties of the modules at these lower IR levels are not published, but they have been found to be well represented by a standard detection-probability function 300, as shown in FIG. 3.

In FIG. 3, curve 300 was obtained by varying the distance between the detection system and a target (e.g., an operator/user of the display), while driving the LED with a fixed pulse width $T_2$. With the pulse width fixed, the IR power reaching the detector varies approximately inversely with the square of the distance to the target, provided that the angular size of the target is chosen large enough to intercept all the radiation from the emitter.

Thus, in curve 300, the IR intensity reaching the target decreases from left to right (e.g., as the target becomes farther and farther away from the display). The probability of any one of the many pulse groups of waveform 201 being detected is then seen to fall smoothly from one to zero over a relatively narrow range of distance (e.g., from about 25 inches to about 33 inches). The spread is caused by internal random noise in the detector which may add to or subtract from the signal. The probability increases most rapidly with target distance when the detection probability is 50%.

Thus, the system will be most sensitive to the position of the operator if a 50% detection probability is required. Such a system can be made insensitive to occasional missed or false detections caused by noise by requiring that, for example, 50% of a large number of pulse groups be detected. This is easily done by the microcontroller, which merely needs to count the number of detections as defined above from a predetermined number $N_p$ of pulse groups.

The effects of noise will be reduced by about the square root of $N_p$ by this means. $N_p$ cannot be chosen too large, of course, because it limits the system's response time.

Thus, the duration of each of the pulse groups of waveform 201 (24 pulses at 38 kHz) is about 0.63 ms. Allowing an equal gap between groups, gives a total emission time or 1.26 Np ms. If $N_p$ is chosen as 150, then the system will respond in about 0.2 seconds to the appearance of an operator. This is essentially the system as described in Levine et al., described above, where the requirement for detection was that 50% of the Np groups be detected.

However, as noted previously, the system will cycle the terminal power on and off if the operator is positioned at a distance which just satisfies the above criterion. This problem is eliminated in the present invention by requiring the detection probability to rise above a fraction F1 to turn the terminal on, and to fall below a fraction F2 to turn the terminal off, where F2 is less than F1.

To maintain range sensitivity, F1 and F2 should both be within the rapidly rising portion of the probability function 300 of FIG. 3. For example, let F1=0.75 and F2=0.25.

Thus, referring to FIG. 3, the power will turn on at an operator distance of about 27" and turn off at an operator distance of about 29" (i.e., there will be about 2" of hysteresis to prevent rapid power cycling). Other values are of course possible, as would be known by one of ordinary skill in the art taking the present application as a whole.

An alternate means of introducing hysteresis is to increase the effective power (Pe) of equation 5 when an operator is detected, by increasing the width T2 of the LED current pulses.

For calibration, the microcontroller 100 checks the state of input pin 109 after each complete pulse sequence (e.g., Np pulse groups) to determine if a range adjustment is required by the operator. An operator-accessible push-button may be provided for this purpose.

If range adjustment is initiated, the microcontroller then delays for about 2 seconds in case the operator needs time to get into position, and then issues a standard pulsing sequence with the pulse length parameter N2 set initially to the lowest value.

If the detected fraction is below F1, then N2 is incremented by 1 and the test repeated. This continues until either the maximum pulse length is reached, or the fraction F1 of the NP groups are detected. In either case, the value N2 is stored in a nonvolatile memory which is part of the microcontroller 100. A particular advantage of this adjustment method compared with the more usual potentiometer adjustment is that it can be done by one person.

Regarding mounting of the system, the IR radiation reflected from the terminal operator is diffused over a broad range of angles by the operator's skin or clothing. Therefore, only a minute fraction of the outgoing radiation reaches the detector module 105, on the order of parts per million, when an operator is at a typical working distance of 24 inches or so.

Thus, even a few parts per million of direct coupling from the emitter to the detector 105 through the mounting arrangement can render the system 1000 unusable. At the same time, costs and manufacturing constraints severely limit the isolation techniques which can be employed. The invention provides the required optical isolation in a way which adds little cost, is compatible with the manufacturing processes used to fabricate the display front cover, and which allows routine cleaning by semiskilled personnel.

An exemplary, satisfactory design is shown in FIGS. 4a–4d. In FIGS. 4a–4d, as further described in detail below, the components are mounted on a small circuit board, which is held firmly against two short tubular bosses molded onto the front display cover by screws (not shown) or the like. The plastic used for the covers and bosses is opaque to infrared. Two separate plastic windows (transparent to infrared, opaque to visible light) are bonded into separate wells with pre-positioned pressure sensitive adhesive. Separate windows are used to prevent infrared, scattered by a scratch into the interior of a single window, from reaching the detector though the light-guide effect.

Turning now to FIGS. 4a–4d, FIGS. 4a and 4b depict a plan (top) view and a side sectional view, respectively, of a circuit board 400 holding infrared emitter 401, and infrared detector module 402. The microcontroller and associated electrical components are on the opposite side of circuit board 400 but are not shown for clarity.

Figure 4A:
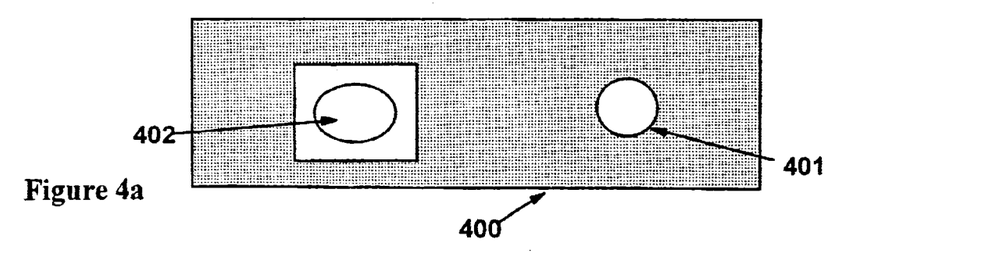
FIGS. 4a–4d illustrate the detection subassembly and the physical mounting arrangement for the present invention in both plan (top) and side section views.
Figure 4B:
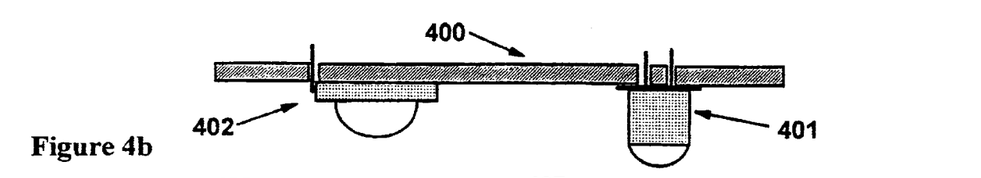
Figure 4C:
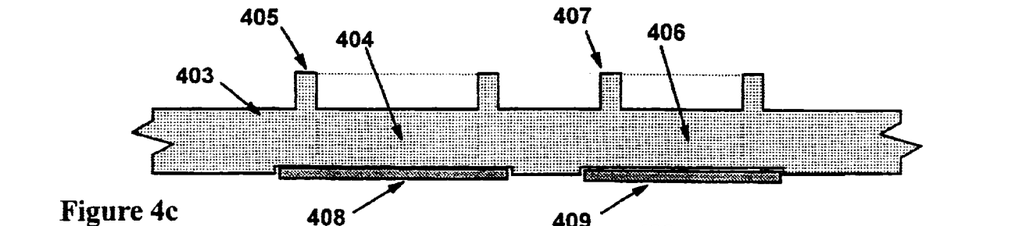
Figure 4D:
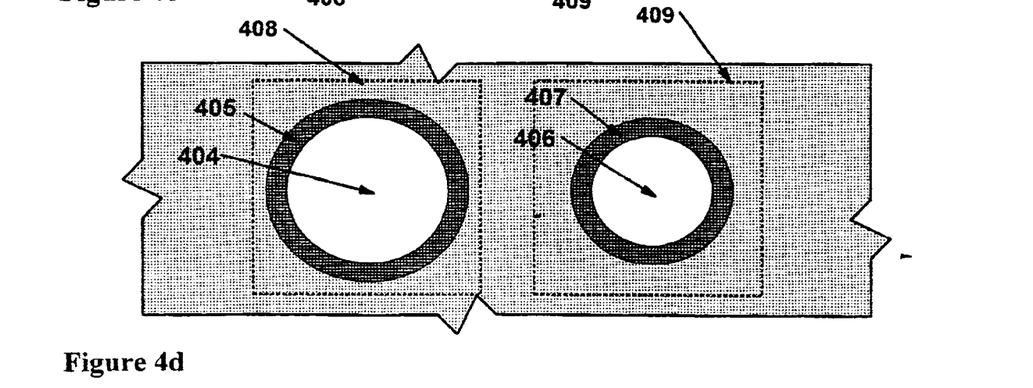

FIGS. 4c and 4d depict the side section view and a plan view, respectively, of a small region 403 of the front display cover. The covers are molded from a plastic or the like which is opaque to the infrared radiation emitted by LED 401.

Holes 406 and 404 provide openings for the outgoing and returning radiation, respectively. Although the openings are shown as circular, the invention is not limited to this shape and other shapes which do not block the light paths are possible. Tubes 405 and 407 are molded extensions of holes 404 and 406, respectively. Circuit board 400 (shown in FIG. 4b) is attached to cover 403 (shown in FIG. 4c, for example) such that the surface of the board 400 is pressed firmly against extensions 405 and 407 shown in FIG. 4c.

Figure 5:
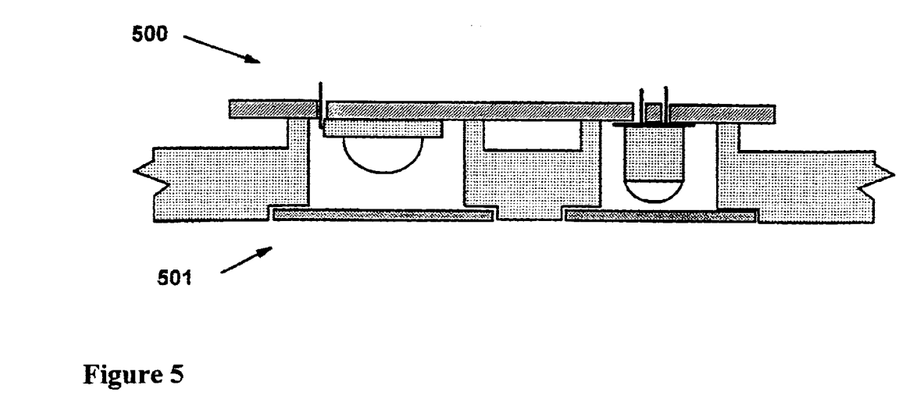
FIG. 5 illustrates the assembled parts in a side sectional view.

The resulting completed assembly is shown in FIG. 5, in which 500 is the circuit board, and 501 is the portion of the cover shown in FIGS. 4a–4d. It is noted that, for clarity, the through-holes are not shaded. Any convenient method of attachment can be used which ensures a snug fit (e.g., screws through board 400 into studs molded onto cover 403, adhesive, etc.). Although the fit will not be perfect, ordinary manufacturing tolerances are adequate to prevent excessive leakage of radiation from the emitter to the detector. If lower-tolerance parts are used, a gasket formed from a soft opaque material can be used to fill the gaps.

FIGS. 4c and 4d also show windows 408 and 409, which protect the optical components and allow the covers to be cleaned (e.g., wiped off). Hence, if the invention is employed in a retail environment (cash registers in grocery stores, restaurants, food establishments, etc.) or the like in which the windows become dirty, the windows may be easily cleaned. These windows 408, 409 are cut from a plastic (e.g., Part Number R2880 "Technalight IR" manufactured by Tsutsunaka Plastic Industry Co., Ltd.) which transmits infrared radiation, but is opaque to visible light. The opaqueness-to-visible-light feature is not essential, but presents a more attractive appearance by hiding the optical components. The windows preferably are inset flush as shown, and are attached with a pressure-sensitive adhesive. This arrangement is generally preferable to one in which the windows must be glued into place because of manufacturing considerations (e.g., applying the glue, curing time, etc.). Scratch-resistant glass with similar optical properties can also be used if the higher cost is acceptable.

It is noted that preferably separate windows are used, as a single window which has been scratched or abraded may act as a light pipe to couple radiation from the emitter to the detector.

While the invention has been described in terms of several preferred embodiments, those skilled in the art will recognize that the invention can be practiced with modification within the spirit and scope of the appended claims.

Thus, with the unique and unobvious features described above, the present invention provides improvements over a presence sensor disclosed in the above-described IBM Technical Disclosure Bulletin Vol. 38, No. 12, December 1995.

The inventive sensor turns the display device on and off according to the presence or absence of a operator/user (e.g., salesperson in a retail environment), etc., thus saving energy.

As described above, the basic device uses an infrared emitter driven by a microcontroller. The emitter projects a narrow beam of infrared towards the display operator. Infrared scattered from the salesperson's skin or clothing is detected by an infrared module, whose output is fed back to the microcontroller for processing.

With the invention, very high detection reliability and extremely low cost are achieved. Further, the present invention provides improved signal processing which must be done, for reasons of cost, in an absolutely minimal processor. Another improvement relates to the mounting arrangements and optical windows, which must be manufactured and assembled at very low cost, and yet provide an extreme degree of optical isolation between the infrared emitter and detector.

Further, while the invention above has been exemplarily described in the environment of a point of sales (POS) terminal, the invention is not limited to a point of sales terminal or environment. Indeed, a desktop display terminal would find great benefit in using the invention. Further, any application requiring activation (or deactivation) based on a presence (or absence) of a user would advantageously employ the invention. Thus, self-flushing toilets, self-activating water faucets, etc. would find the invention beneficial.

What is claimed is:

1. A presence detector, comprising:
   an optical emitter for emitting optical radiation;
   an optical detector for detecting a presence of an object based on receiving said optical radiation; and
   a microcontroller for controlling said optical emitter and processing said optical detector output, such that a range adjustment and range hysteresis based on said object are provided by software in said microcontroller,
   wherein said optical detector determines the presence of an object when a first fraction of the emitted optical radiation is sensed, and
   wherein said optical detector determines an object is no longer present when a second fraction of emitted optical radiation less than the first fraction is sensed.

2. The presence detector of claim 1, wherein said optical emitter, said optical detector, and said microcontroller are integrated into a cover of a display terminal, with optical isolation between said optical emitter and optical detector being provided by said cover.

3. The presence detector of claim 2, wherein first and second optical windows are provided for said optical emitter and said optical detector, respectively, to eliminate optical coupling between said emitter and said optical detector.

4. The presence detector of claim 2, wherein said optical radiation includes infrared radiation.

5. The presence detector of claim 1, wherein first and second optical windows are provided for said optical emitter and said optical detector, respectively, to eliminate optical coupling between said emitter and said optical detector.

6. The presence detector of claim 5, wherein said optical radiation includes infrared radiation.

7. The presence detector of claim 1, wherein said optical detector comprises an optical detection module.

8. The presence detector according to claim 1, wherein said first fraction of detected radiation of said emitted radiation is approximately 0.75 and said second fraction is approximiately 0.25.

9. A presence detector, comprising:
   an optical emitter for emitting optical radiation;
   an optical detector for detecting presence of an object based on receiving said optical radiation; and
   a microcontroller for controlling said optical emitter and processing said optical detector output, such that a range adjustment and range hysteresis based on said object are provided by software in said microcontroller,
   wherein said optical emitter, said optical detector, and said microcontroller are integrated into a cover of a display terminal,
   wherein said optical detector determines the presence of an object when a first fraction of the emitted optical radiation is sensed, and
   wherein said optical detector determines an object is no longer present when a second fraction of emitted optical radiation less than the first fraction is sensed.

10. The presence detector of claim 9, wherein said cover provides an optical isolation between said optical emitter and said optical detector.

11. The presence detector of claim 10, wherein first and second optical windows are provided for said optical emitter and said optical detector, respectively, to eliminate optical coupling between said emitter and said optical detector.

12. The presence detector of claim 10, wherein said optical radiation includes infrared radiation.

13. The presence detector of claim 9, wherein first and second optical windows are provided for said optical emitter and said optical detector, respectively, to eliminate optical coupling between said emitter and said optical detector.

14. The presence detector of claim 13, wherein said optical radiation includes infrared radiation.

15. The presence detector of claim 9, wherein said optical detector comprises an optical detection module.

16. A display terminal, comprising:
    an optical emitter for emitting optical radiation;
    optical detector for detecting presence of an object based on receiving said optical radiation; and
    a microcontroller for controlling said optical emitter and processing said optical detector output, such that a range adjustment and range hysteresis based on said object are provided by software in said microcontroller,
    wherein said optical detector determines the presence of an object when a first fraction of the emitted optical radiation is sensed, and
    wherein said optical detector determines an object is no longer present when a second fraction of emitted optical radiation less than the first fraction is sensed.

17. The display terminal of claim 16, further comprising:
    a cover for integrally housing said optical emitter, said optical detector, and said microcontroller.

18. The display terminal of claim 17, wherein said cover optically isolates said optical emitter and said optical detector.

19. The display terminal of claim 17, wherein said optical radiation includes infrared radiation.

20. The display terminal of claim 16, wherein first and second optical windows are provided for said optical emitter and said optical detector, respectively, to eliminate optical coupling between said emitter and said optical detector.

21. The display terminal of claim 16, wherein said optical radiation includes infrared radiation.

22. A chatter-free, infrared emitter-detector, comprising:

an infrared emitter operable to emit a plurality of digital pulses of infrared radiation directed at an operator;

infrared detector operable to sense said infrared radiation after reflection from said operator; and a controller operable to cause said infrared detector to emit a first signal upon sensing of a first fraction of said plurality of digital pulses, said controller being operable to emit a second signal upon sensing of a second fraction of said plurality of digital pulses, said first fraction being larger than said second fraction.

23. The emitter-detector according to claim 22, wherein said operator comprises a point-of-sale (POS) operator.

24. The emitter-detector according to claim 23, wherein said first signal comprises a signal representing detection of the presence of said operator.

25. The emitter-detector according to claim 22, wherein said first signal comprises a signal representing a detection of the presence of said operator.

26. The emitter-detector according to claim 22, wherein said second signal comprises a signal representing detection of the absence of said operator.

27. An infrared emitter-detector unit comprising:

a panel comprising a surface, two apertures therein extending through said surface, and two cavities, each cavity extending to one of said two apertures, said two cavities being isolated from radiation communication from each other;

an infrared emitter disposed within a first one of said two cavities and operable to emit infrared radiation through a first one of said two apertures;

an infrared detector disposed within a second one of said two cavities and operable to receive infrared radiation through a second one of said two apertures; and a pair of infrared-transparent covers each being disposed over one of said two apertures, said covers being separated to prevent transmission of infrared radiation therebetween, wherein said infrared detector determines the presence of an object when a first fraction of the emitted infrared radiation is sensed, and wherein said optical detector determines an object is no longer present when a second fraction of emitted infrared radiation less than the first fraction is sensed.

28. The emitter-detector unit according to claim 27, wherein said unit comprises a sealed unit.

29. A method of sensing a presence of an object, comprising:

emitting a plurality of digital pulses of infrared radiation directed at an operator;

sensing said infrared radiation after reflection from said operator;

causing a first signal to be emitted upon sensing of a first fraction of said plurality of digital pulses; and emitting a second signal upon sensing of a second fraction of said plurality of digital pulses;

said first fraction being larger than said second fraction.

* * * * *